United States Patent Office 3,070,583
Patented Dec. 25, 1962

3,070,583
METHOD FOR SOLUBILIZING AN ACIDIC CO-POLYMER, AND WATER-SOLUBLE PRODUCT OBTAINED THEREBY
Carl A. Uraneck, Phillips, Tex., and Richard J. Sonnenfeld, Norman, Okla., assignors to Phillips Petroleum Company, a corporation of Delaware
No Drawing. Filed Jan. 4, 1954, Ser. No. 402,146
10 Claims. (Cl. 260—82.1)

This invention relates to an improved method for solubilizing acidic polymeric materials.

Polymeric materials containing a multiplicity of acid groups, e.g., butadiene/acrylic acid copolymers, are frequently very difficult to dissolve in aqueous basic solutions. An aqueous solution of an alkali metal hydroxide, carbonate, or other basic compound reacts with the surface acid groups first, which results in a swelling effect on the surface of the polymer particles and impedes further contact of the base with the remaining acid groups within the polymer mass. The present invention provides a method for overcoming this difficulty. The method comprises incorporating a substantially anhydrous basic compound, which is capable of forming a water-soluble salt with the acid groups in the polymer, into the polymeric materials by any suitable means, such as milling. On contacting the mixture with water there is formed an aqueous solution of the polymeric salt. Polymeric materials with which this invention is particularly concerned are copolymers of an acidic monomer containing at least one acidic group per molecule with one or more materials copolymerizable therewith.

The principal object of the present invention is to provide an improved method for solubilizing polymeric materials containing at least one acid group. More particularly, it is an object of the present invention to solubilize polymers containing multiple carboxy groups by incorporating a basic material into the dry polymer. A specific object of the present invention is to solubilize polymers of acidic monomers containing at least one carboxy group per molecule with one or more materials copolymerizable therewith. A further object is to provide a mixture of a polymer and a basic compound which can be readily shipped and stored and on contact with water will form a solution of a polymeric salt.

When operating according to the present invention, a basic compound is brought into intimate contact with the solid polymer by any suitable mixing procedure, such as milling, prior to mixing it with water. The polymer mass is rendered much more amenable to thorough wetting by mixing it with the basic compound, and when this mixture is brought into contact with water, solution occurs much more readily than when the solid polymer is added to an aqueous solution of the base. Thus, the production of aqueous solutions of polymeric salts containing a multiplicity of acid groups is greatly facilitated when operating in the manner herein described.

Basic compounds which are applicable are alkali metal hydroxides, carbonates, and bicarbonates such as lithium, sodium, and potassium hydroxides, carbonates, and bicarbonates, and water-soluble amines such as methylamine, ethylamine, dimethylamine, diethylamine, n-propylamine, isopropylamine, n-butylamine, sec-butylamine, tert-butylamine, and mono-, di-, and triethanolamine. Mixtures of bases can be used; e.g., the rate of solubilization may be increased by using a small amount of a strong base with a larger amount of a weaker but more voltatile base. Carbonates liberate $CO_2$ which, being water-soluble, permits better water penetration into the polymer than would be obtained with an equal amount of another type of base. More important, the liberated $CO_2$ effects a mechanical shredding and tunneling of the swollen surface, thereby exposing additional surface to the aqueous solvent. Low boiling amines, such as methylamine, may be incorporated into the polymer under conditions of elevated pressure and low temperature.

The amounts of base employed is generally that which is sufficient to effect from 50 to 100 percent neutralization of the acid groups in the polymer. One of the factors which governs the amount of base required to effect solubilization is the ratio of acid groups to carbon atoms in the polymer. The larger the proportion of acid groups to carbon atoms, the more readily the polymer can be dissolved.

The polymeric materials having a multiplicity of carboxy groups which can be solubilized in accordance with the process of this invention are prepared by the copolymerization of an acidic monomer containing at least one carboxy group per molecule with conjugated diene alone, or in addition one or more other materials copolymerizable therewith. Acidic monomers containing at least one carboxy group per molecule which are applicable include acrylic acid, alpha and beta chloroacrylic acids, and various alpha and beta alkyl-substituted derivatives in which the alkyl group contains from 1–8 carbon atoms such as methacrylic acid, crotonic acid, alpha and beta ethyl-, propyl-, butyl-, amyl-, hexyl-, heptyl-, and octyl-acrylic acids; phenylacrylic acids, i.e., atropic and cinnamic acids; and vinylacrylic acids. Unsaturated acids such as itaconic and teraconic acids are also applicable. The list includes unsaturated dibasic acids such as maleic and fumaric and certain derivatives thereof such as mono-esters from methyl to octyl, alkyl derivatives, i.e., alkyl groups from methyl to octyl attached to the central carbon atoms, and halogen-substituted derivatives such as chloromaleic acids and monoesters of halogen-substituted maleic and fumaric acids. Of the acidic monomers which are applicable, acrylic, methacrylic, and chloroacrylic acids are most frequently preferred.

The acidic monomer may contain acid groups other than carboxy, such as sulfonic, phosphonic, acid sulfate, or acid phosphate groups.

Acidic polymers can be obtained indirectly, i.e., by treatment of a polymer to convert any groups present to acidic groups or to introduce acidic groups into the polymer by any method which will yield the desired product. For example, a polymer containing —CN groups can be converted to one containing carboxy groups by hydrolysis.

Materials copolymerizable with acidic monomers in addition to conjugated dienes include styrene, alpha-methylstyrene, various alkyl- and halogen-substituted styrenes, acrylonitrile, methacrylonitrile, acrylates such as methyl acrylate, ethyl acrylate, and methyl methacrylate, vinyl chloride, vinylidene chloride, vinyl acetate, methyl vinyl ketone, methyl isopropenyl ketone, methyl vinyl ether, and the like. The preferred monomers are conjugated dienes or mixtures of conjugated dienes with each other or with other polymerizable compounds in addition to the acidic monomers, e.g., terpolymers, polymers of four or more monomers, etc., are applicable in this invention as well as copolymers. The conjugated dienes employed are preferably those which contain from 4–6, inclusive, carbon atoms per molecule but those containing more carbon atoms per molecule, e.g., eight, can also be used. These compounds include 1,3-butadiene, chloroprene, isoprene, piperylene, methylpentadiene, 2,3-dimethyl-1,3-butadiene, and others. Furthermore, various alkoxy, such as methoxy and ethoxy, and cyano derivatives of these conjugated dienes can also be employed, e.g., 2-methoxybutadiene and 1-cyanobutadiene.

The polymers can be prepared by emulsion, pearl, solution, or bulk polymerization initiated by either an ionic or free radical mechanism.

The polymer must be of such nature that it will be soluble in an aqueous solution of the basic material with which it is to be admixed. In order for a polymer to be soluble, the ratio of carbon atoms to acid groups should not be greater than 25:1 and preferably 20:1 or less. Another factor which affects solubility is the molecular weight of the polymer. As the molecular weight increases, the ratio of acid groups to carbon atoms must be increased for the polymer to be soluble. In any case, the ratio of acidic monomer to other monomer is adjusted in such a way that the resulting polymer will be soluble in an aqueous solution of the base which is used to convert it to the polymeric salt.

The compositions prepared according to this invention are substantially anhydrous, granular, or compact mixtures of polymer and base, awaiting only the addition of water to form solutions. Hence, they are in the nature of anhydrous concentrates, the absence of liquid permitting convenience in handling and economy in weight and volume. They can be readily shipped and stored and put into solution when desired at the site of use. They can be readily dissolved in water and the resulting solutions used in coating compositions, for the production of films, in latex base paints, and the like. The compositions can be used for soil treatment. For such applications an inert material such as ammonium sulfate, ammonium nitrate, ammonium phosphate, or other substance which will serve as a fertilizer can be present. For various types of coatings a pigment can be incorporated along with the base into the polymer and the mixture then dispersed in water. When the polymers are to be used in adhesive compositions, coloring matter in the form of a dye can be added to give the color needed for a particular use.

*Example*

A butadiene/acrylic acid copolymer was prepared at 41° F. in accordance with the following recipe:

|  | Parts by weight |
|---|---|
| Butadiene | 50 |
| Acrylic acid | 50 |
| Benzene | 50 |
| Water | 315 |
| Duponol ME [1] | 8 |
| Tert-dodecyl mercaptan | 1 |
| Tert-butylisopropylbenzene hydroperoxide | 0.229 |
| KCl | 0.1 |
| $FeSO_4 \cdot 7H_2O$ | 0.278 |
| $K_4P_2O_7$ | 0.330 |

[1] Sodium lauryl sulfate.

A conversion of 73 percent was reached in 5 hours. The reaction was shortstopped with 0.2 weight percent di-tert-butylhydroquinone, based on monomers charged, and 2 percent by weight of phenyl-beta-naphthylamine, based on the polymer, was added as the antioxidant. The latex was coagulated by the salt-alcohol method and the polymer was dried in a 60° C. oven for approximately 16 hours.

To 30 grams of the polymer, 10 grams of sodium carbonate was added on the mill and milling was continued until thorough mixing was secured. A strip of the treated polymer was submerged in water and allowed to stand 15 hours. The sample was substantially completely dissolved. A control was run in which a strip of the untreated polymer was submerged in a sodium carbonate solution with the amount of sodium carbonate used being the same as that present in the first test. After 15 hours, the sample was swollen but was only partially dissolved.

From the above specification it is obvious that many compositions may be prepared within the scope of the invention. It is further evident from the above example and specification that an improved method of solubilizing polymers has been discovered and that it is superior to conventional methods of solubilizing polymers.

We claim:

1. An improved process for solubilizing an acidic polymer prepared by polymerizing an acidic monomer containing at least one acid group per molecule with copolymerizable material comprising a conjugated diene containing 4 to 6 carbon atoms per molecule, the ratio of carbon atoms to acid groups in said acidic polymer being not greater than 25:1, which process consists of milling into an uncomminuted mass of said acidic polymer, under essentially anhydrous conditions, a basic compound capable of forming a water soluble salt with said acidic polymer and capable of evolving carbon dioxide when the resulting mixture is contacted with water, said basic compound being employed in an amount sufficient to cause said carbon dioxide to effect mechanical shredding and tunneling of said resulting mixture when the same is contacted with an aqueous solvent.

2. The process of claim 1 wherein said acidic monomer is selected from the group consisting of acrylic acid, halogen-substituted acrylic acid, alkyl-substituted acrylic acid, phenylacrylic acid, and vinylacrylic acid.

3. The process according to claim 1 wherein said acidic monomer is acrylic acid.

4. The process according to claim 1 wherein said conjugated diene is 1,3-butadiene.

5. The process according to claim 1 wherein said acidic monomer is acrylic acid and said conjugated diene is 1,3-butadiene.

6. The process according to claim 1 wherein said acidic monomer is acrylic acid, said conjugated diene is 1,3-butadiene, and said basic compound is an alkali metal carbonate.

7. The process according to claim 6 wherein said alkali metal carbonate is sodium carbonate.

8. A new composition of matter comprising a water soluble, dry uncomminuted mass of (1) an acidic polymer of an acidic monomer containing at least one acid group per molecule with copolymerizable material comprising a conjugated diene containing 4 to 6 carbon atoms per molecule, the ratio of carbon atoms to acid groups in said acidic polymer being not greater than 25:1, and (2) a basic compound intimately milled into said acidic polymer, said basic compound being capable of forming a water soluble salt with said acidic polymer and capable of evolving carbon dioxide when said uncomminuted mass is contacted with water, said basic compound being present in said uncomminuted mass in an amount sufficient to cause said carbon dioxide to effect mechanical shredding and tunneling of said uncomminuted mass when the same is contacted with an aqueous solvent.

9. The composition according to claim 8 wherein said acidic monomer is acrylic acid, said conjugated diene is 1,3-butadiene, and said basic compound is an alkali metal carbonate.

10. The composition according to claim 9 wherein said alkali metal carbonate is sodium carbonate.

References Cited in the file of this patent

UNITED STATES PATENTS

| 2,607,762 | Bowen | Aug. 19, 1952 |
| 2,625,529 | Hedrick et al. | Jan. 13, 1953 |
| 2,652,380 | Hedrick et al. | Sept. 15, 1953 |
| 2,669,550 | Brown | Feb. 16, 1954 |
| 2,697,672 | Rossin | Dec. 21, 1954 |
| 2,763,633 | Gray | Sept. 18, 1956 |

OTHER REFERENCES

Marvel et al.: "J. Polymer Science," volume VIII, No. 6, pages 599–605.